United States Patent
Willinger

[11] 3,720,317
[45] March 13, 1973

[54] AQUARIUM FILTER

[75] Inventor: Allan H. Willinger, New Rochelle, N.J.

[73] Assignee: Metaframe Corporation, Maywood, N.J.

[22] Filed: May 3, 1971

[21] Appl. No.: 139,666

Related U.S. Application Data

[63] Continuation-in-part of Ser. No. 832,172, June 11, 1969, Pat. No. 3,630,367.

[52] U.S. Cl..............................210/94, 210/169
[51] Int. Cl. ...................................B01d 35/14
[58] Field of Search..........210/85, 86, 87, 90, 91, 92, 210/94, 95, 169

[56] References Cited

UNITED STATES PATENTS

| | | | |
|---|---|---|---|
| 2,653,908 | 9/1953 | Rodda | 210/169 |
| 2,646,885 | 7/1953 | James | 210/90 |
| 2,782,161 | 2/1957 | Willmyer et al. | 210/169 |
| 3,358,836 | 12/1967 | Schmitt | 210/90 |
| 2,669,707 | 2/1954 | Ehrman | 210/87 X |
| 3,332,552 | 7/1967 | Zabel | 210/86 |

Primary Examiner—Reuben Friedman
Assistant Examiner—T. A. Granger
Attorney—Friedman & Goodman

[57] ABSTRACT

A filtering device comprising a housing in which is provided a partition for separating the housing into first and second chambers in communicating relation. The housing is provided with at least one opening through which water may enter into the first chamber from an external water-carrying source. The second chamber includes a filtering assembly for cleansing water which has entered the first chamber and which thereafter flows into the second chamber. An air conduit is provided for directing air into the second chamber for urging water through the filtering assembly. Likewise, a conduit is provided for directing both air and cleansed water out of the second chamber after the water has been cleansed by the filtering assembly. An indicator is provided for signalling inflow of water into the first chamber and outflow from the latter into the second chamber.

11 Claims, 4 Drawing Figures

PATENTED MAR 13 1973

ALLAN H. WILLINGER
INVENTOR

BY Friedman and Grodman
ATTORNEYS

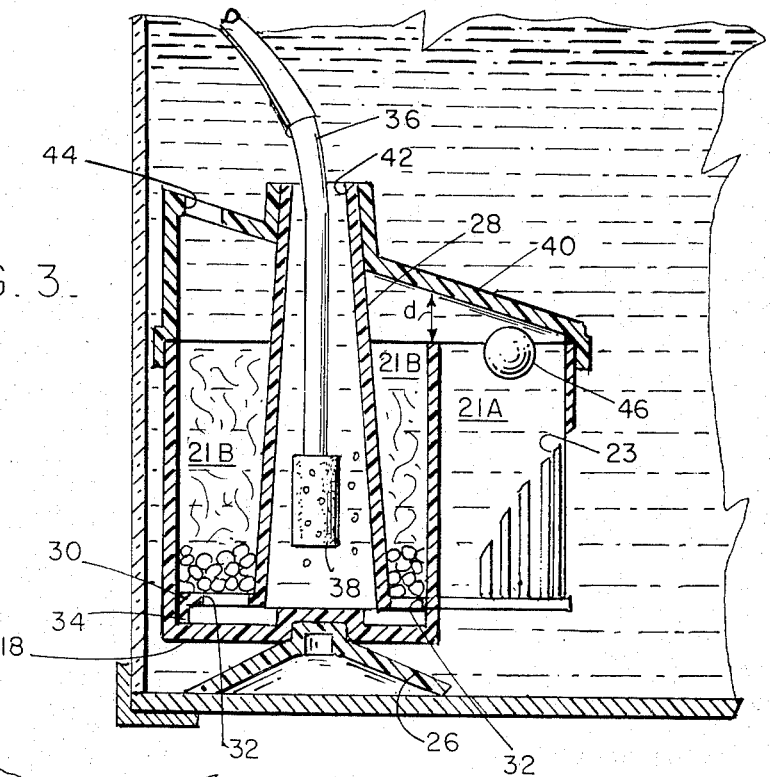
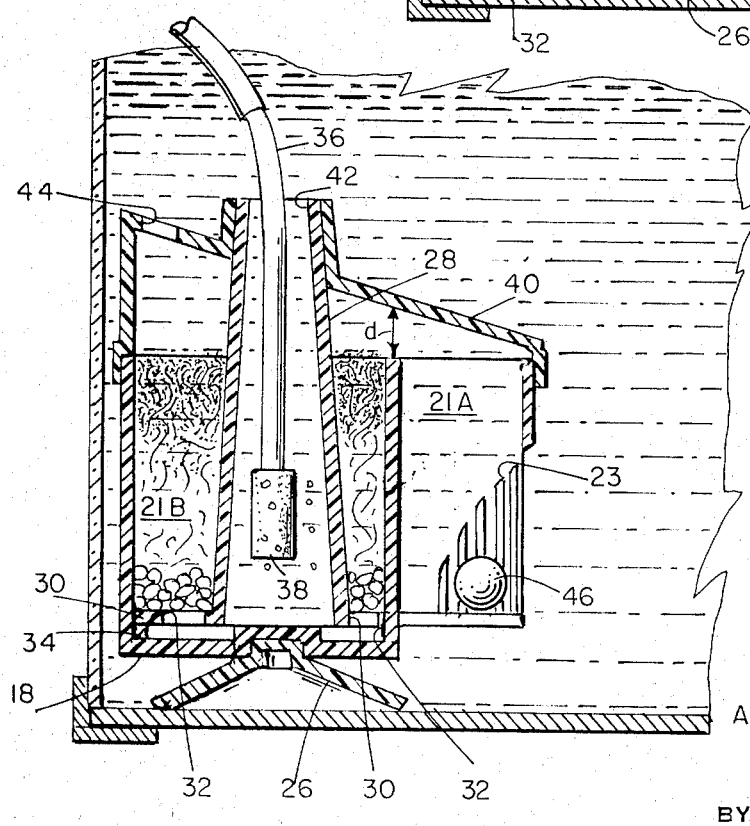

3,720,317

AQUARIUM FILTER

CROSS-REFERENCE TO RELATED APPLICATIONS

This application is a continuation-in-part of U.S. Application Ser. No. 832,172, filed on June 11, 1969 now U.S. Pat. No. 3,630,367.

BACKGROUND OF THE INVENTION

The present invention relates generally to an aquarium filter, and more particularly to an aquarium filter that is provided with an indicator to signal the operability of the filter.

Filters that may be utilized in fish tanks and aquariums or the like generally are provided with a housing in which is contained a filtering assembly and is arranged so that water may pass through the filtering assembly to be cleansed by the latter. Generally, the water flows into the housing through suitably located openings in the latter and air is pumped into the housing from an external source, such as a pump or the like, to urge the water in a preferred direction throughout the filtering assembly, the latter which may include glass wool or the like, and thereafter, the water, together with the air injected into the filtering housing may pass out of the housing to return into the fish tank or aquarium.

Generally, the housing is transparent and, therefore, as air is injected into the housing, air bubbles are easily visible and pass from the housing into the aquarium. However, as those skilled in the art readily appreciate, the filtering assembly or glass wool will become clogged after extended use as it removes debris and the like from water that passes through the housing and, thus, although the air bubbles injected into the housing may indicate that the pump is operating, these air bubbles may not necessarily indicate that water is in fact passing through the clogged filtering assembly. The hobbyist must, therefore, generally inspect the filtering device by dismantling the latter so as to most effectively determine whether or not the glass wool is clogged and, thus, whether or not the filtering device is in fact operating. This is a cumbersome situation at best both from the standpoint of time and convenience.

SUMMARY OF THE INVENTION

Accordingly, it is an object of the present invention to provide a filtering device that may be utilized in an aquarium or the like.

It is another object of the present invention to provide an aquarium filtering device that includes means for indicating the operability of the filter.

It is still another object of the present invention to provide an aquarium filter having means for visually signalling the passage of contaminated water through the filtering portions thereof.

It is still another object of the present invention to provide an aquarium filter that includes a body that is readily displaceable between two extreme positions, one of which positions indicates the operability of the filter and the other of which indicates the inoperability of the filter.

To this end, the present invention relates to a filtering device comprising a housing in which is provided a partition for separating the housing into first and second chambers in communicating relation. The housing is provided with at least one opening through which water may enter into the first chamber from an external water-carrying source. The second chamber includes a filtering assembly for cleansing water which has entered the first chamber and which thereafter flows into the second chamber. An air conduit is provided for directing air into the second chamber for urging water through the filtering assembly. Likewise, a conduit is provided for directing both air and cleansed water out of the second chamber after the water has been cleansed by the filtering assembly. An indicator is provided for signalling inflow of water into the first chamber and outflow from the latter into the second chamber.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which:

FIG. 3 illustrates a cross-sectional view taken along the line A—A in FIG. 1 of the operative association of the aquarium filter pursuant to the present invention in an aquarium and illustrates still further the indicator signalling that the aquarium filter is in operative condition; and FIG. 4 is a cross-sectional view similar to that of FIG. 3 and differing from the latter in that the indicator is signalling the inoperative condition of the filter pursuant to the present invention.

DETAILED DESCRIPTION OF THE INVENTION

Figure 1:
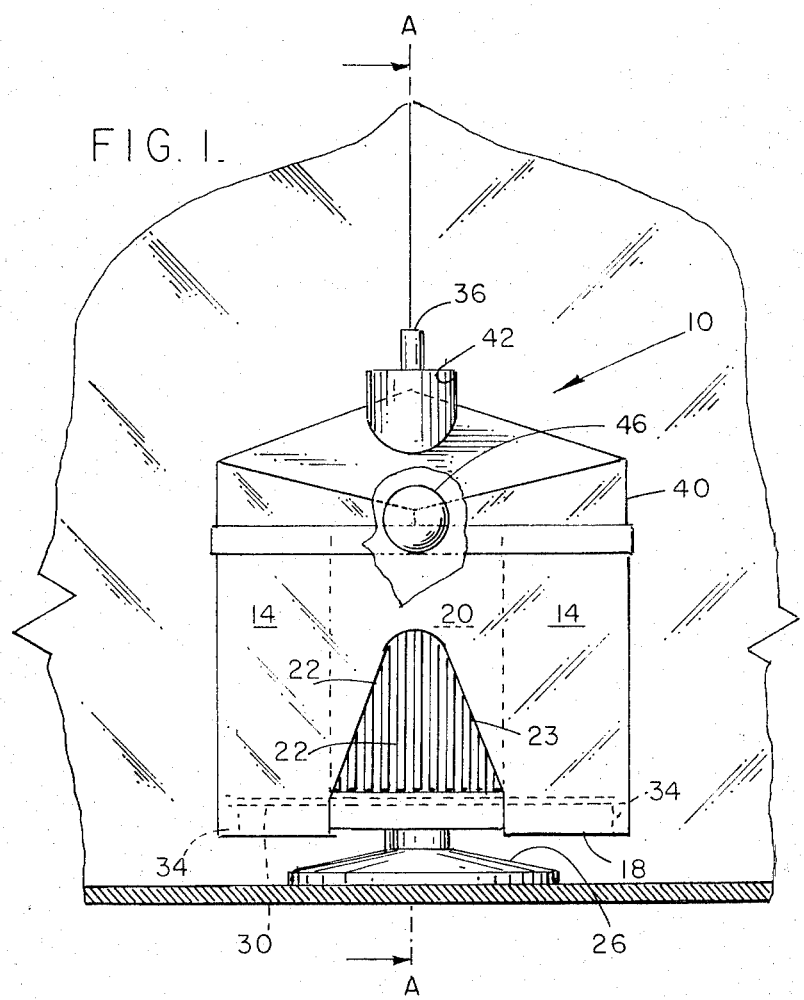
FIG. 1 is a front elevational view illustrating the filtering device pursuant to the present invention as disposed at the bottom of an aquarium.
Figure 2:
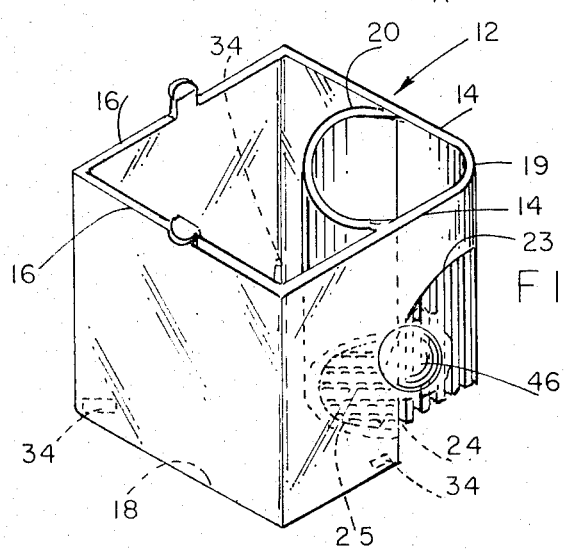
FIG. 2 is a perspective view illustrating a portion of the housing of the filtering device pursuant to the present invention.

Referring now to the drawings and more particularly to FIGS. 1 and 2 thereof, the present invention comprises an aquarium filter generally denoted by the reference character 10. The filter 10 includes a housing 12 defined by a pair of front side walls 14 and a pair of rear side walls 16 all integrally interconnected to one another and to a bottom portion 18. The front side walls 14 are separated from one another through the intermediary of a rounded corner 19, whereas the rear side walls 16 are interconnected to one another in mutually perpendicular relation as illustrated in FIG. 2. Furthermore, as illustrated in FIG. 2, the housing 12 is provided with a partition 20 which is rounded in cross-section and acts to define two chambers 21A and 21B, respectively, the latter chambers being most clearly illustrated in FIGS. 3 and 4. Chamber 21A is defined by the front side walls 14 and the partition 20, whereas the chamber 21B is defined by the rear side walls 16 together with the partition 20.

As illustrated most clearly in FIG. 2, the front side walls 14, or in effect, the rounded corner portion 19 separating the front side walls 14, is provided with a plurality of vertically extending slots 22 having a somewhat parabolic border 23. Similarly, the bottom portion 18 of the housing 12 is provided with a plurality of spaced slots 24 having a generally circular border 25 as shown in phantom in FIG. 2. The slots 22 and 24 extend generally relative to one another in mutually perpendicular relation. Also illustrated in FIG. 1 is the fact that the aquarium housing 12 at the bottom portion 18 thereof is provided with a support base 26 for the purpose as will be further described below.

Referring now to FIGS. 3 and 4, the latter FIGURES which are generally identical except in the manner as will be further described below, the aquarium filter 10 pursuant to the present invention further comprises an elongate annular conduit 28 which is generally tapered in cross-section and has a pair of opposite open ends. A platform 30 having a plurality of slotted openings 32 therein is fixedly connected to the elongate annular conduit 28 at the lower open end thereof and extends generally transversely thereto. The platform 30 rests on a number of spacing lugs 34 which are provided at the bottom portion 18 of the housing 12. The platform 30 may be press-fit into the housing 12 until the platform 30 contacts the spacing lugs 34, the latter which act to provide a clearance or define a third chamber between the platform 30 and the bottom portion 18 of the housing 12, which third chamber communicates with the conduit 28 and the second chamber 21B through the intermediary of the slotted openings 32 provided in the platform 30. The platform 30 internally of the chamber 21B acts to support a filtering assembly such as glass wool, charcoal and the like and, thus, the second chamber 21B may be characterized as a filtering or cleansing chamber through which contaminated water may pass to be decontaminated thereby.

An air inlet conduit 36 is provided for directing air into the elongate annular conduit 28 and is connected at one end thereof to a pump (not shown in the drawings) and at the other end to an air permeable element 38 which acts to disperse incoming air throughout the elongate annular conduit 28. The function of the air inlet conduit 36 and air permeable element 38 will be further clarified below.

The housing 12 is provided with a cover member 40 which may be press-fit onto the front and rear side walls 14 and 16 respectively to embrace the latter. The cover member 40 is furthermore provided with a raised opening 42 which surrounds the uppermost portion of the elongate annular conduit 28 so that air and cleansed or contaminated water may be expelled from the aquarium filter 10. The cover member 40 is also provided with an air vent or opening 44 at one corner thereof so that, when the aquarium filter 10 is initially disposed into the aquarium, water may readily enter into the filter 10 through the slotted openings 22 and 24 respectively and air existing in the aquarium filter 10 may be readily expelled through the air vent 44 and thus will not present any obstacle to the inflow of water through the slotted openings 22 and 24 respectively.

The aquarium filter 10 as indicated above is provided with an indicating means for signalling its operability. The indicating means acts to provide a visual signal to an observer that water is flowing into the chamber 21A through the intermediary of the slotted openings 22 and 24 respectively. In this respect, the indicating means pursuant to the present invention comprises a spherical body 46, the latter having a specific gravity which is greater than that of water and, therefore, in the absence of water flowing in the chamber 21A through the intermediary of the slots 22 and 24 respectively, the spherical body 46 will remain at the bottom of the chamber 21A adjacent the slotted openings 24 therein. However, when water flows into the chamber 21A through the intermediary of the slotted openings 22 and 24 respectively, the flow of water is sufficient for causing the spherical body 46 to ascend in the chamber 21A to a position as illustrated in FIG. 3. In order to prevent the spherical body 46 from passing out of the chamber 21A and into the chamber 21B, the cover member 40 is inclined in a manner as illustrated in FIG. 3 such that the vertical space d between the uppermost edge of the partition 20 and lowermost surface of the cover member 40 is substantially less than the diameter of the spherical body 46. Thus, when the spherical body 46 elevates to that position as illustrated in FIG. 3 the latter cannot pass from chamber 21A into 21B.

As indicated above, FIGS. 3 and 4 differ from one another in one respect, namely, in FIG. 3 the spherical body 46 is in its uppermost position and in FIG. 4 the spherical body 46 is in its lowermost position and resting upon the slotted openings 24. The significance of the upper position of the spherical body 46 as opposed to the lower position of the latter is of great importance. In this respect, as those skilled in the art readily understand, the filtering material or glass wool and charcoal which are contained internally of the chamber 21B become clogged after a period of time and, thus, upon becoming clogged the latter obstructs the flow of water and must be replaced immediately to maintain the aquarium in which the aquarium filter 10 is disposed in a cleansed condition. Thus, notwithstanding the fact that the pump is operating as may be indicated by the air bubbles which ascend in the elongate annular conduit 28, the filtering device 10 may be clogged and, therefore, inoperable, which operability may not be necessarily easily or readily observable. However, because of the provision of the spherical body 46, the glass wool and charcoal which constitutes the filtering materials may become clogged and thus prevent water from flowing into the chamber 21A through the slotted openings 22 and 24 respectively. Therefore, the spherical body 46 will remain in its lowermost position in the chamber 21A. In its lowermost position, the spherical body 46 thus readily indicates to an observer that water is not flowing throughout the filtering device 10 and, therefore, the inoperability of the filtering device 10. However, as long as the filtering materials remain clear and unclogged water will flow into the chamber 21A through the intermediary of the slotted openings 22 and 24 respectively and thus cause the spherical body 46 to ascend into its uppermost position as indicated in FIG. 3. The uppermost position of the spherical body 46 thus readily indicates to an observer that the filtering device is operating and that the filtering materials in the filtering device are unclogged.

In order to enhance the signalling effectiveness of the indicating means pursuant to the present invention, the portion of the front side walls 14 to the left of, or above, the parabolic border 23, as illustrated in FIGS. 3 and 4 is provided as being opaque in nature, whereas the portion of the front side walls 14 below and to the right of the parabolic border 23, as illustrated in FIGS. 3 and 4, wherein the slots 22 are provided, is generally transparent. In this respect, when the spherical body 46 is in its lowermost position on the bottom of the chamber 21A, the spherical body 46 may be readily observable and, therefore, its presence would indicate that the filtering device is not operating. However, when the spherical body 46 is in its uppermost position as illustrated in FIG. 3, the opaque portion of the front side walls 14 acts to conceal the spherical body 46 and, therefore, the absence of the spherical body 46 from view would indicate that the filtering device is in fact operating. Thus, an observer need not determine whether or not the spherical body 46 is in its upper position or its lower position but need only examine the filtering device to determine whether or not the spherical body 46 is in fact visible. If in fact the spherical body 46 is observable, clearly the observer will be signalled that the aquarium filter is not operating. However, when the spherical body 46 is absent from view, the observer will be readily signalled that the filter is operating.

In operation, the aquarium filter 10 is disposed internally of an aquarium so that water in the aquarium may readily enter into the housing 12 while existing air initially in the housing 12 is expelled through the air vent 44. The support base 26 of the housing 12 acts to space the bottom portion 18 of the housing 12 from the bottom of the aquarium and, therefore, water may readily flow into chamber 21A through the slotted openings 22 and 24 respectively without obstacle thereto. The inflow of water into chamber 21A will cause the spherical body 46 to ascend to the uppermost position as indicated in FIG. 3 and water will then continue to flow out of chamber 21A into chamber 21B to be cleansed by the latter through the intermediary of the filtering materials or glass wool and charcoal. Water will then, after being decontaminated in the chamber 21B, flow into the elongate annular conduit 28 through the openings 32 provided in the platform 30 and will be expelled from the conduit 28 at the uppermost open end of the latter. The inflow of water into the housing 12 will transverse the aforementioned path because of the injection of air into the elongate annular conduit 28 through the intermediary of the air inlet conduit 36 and the air permeable member 38. Thus, the pressurized air which is injected into the annular conduit 28 causes the continuous inflow of water into the housing 12 to be cleansed by the latter and expelled therefrom together with the pressurized air through the upper opening in the annular conduit 28.

Eventually, the filtering materials or glass wool and charcoal will become fully clogged with the debris withdrawn from the water and upon so becoming clogged, the filtering elements will cease to function. At this point, upon ceasing to function the lack of inflow of water into the chamber 21A will result in the descending of the spherical body 46 to the lowermost portion of the chamber 21A. The spherical body 46 as indicated above will descend because of the nature of its specific gravity which is slightly greater than that of water and in the absence of water flow between the channels 21A and 21B, the spherical body 46 has little alternative other than to descent in the chamber 21A. Upon so descending and becoming visible through the lower transparent portions of the front side walls 14 an observer will be readily signalled that the aquarium filter is not operating and that the glass wool must be replaced immediately. Upon replacement of the contaminated glass wool with uncontaminated glass wool, the filtering device pursuant to the present invention will again operate and cause the spherical body 46 to ascend in the chamber 21A in a manner as indicated above.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. An aquarium filtering device for an aquarium tank having contaminated and decontaminated water therein, said filtering device comprising in combination a housing provided with three chambers defining an inlet chamber in fluid flow relation with the aquarium tank and a filtration chamber in fluid flow relation with said inlet chamber and an outlet chamber in fluid flow relation with said filtration chamber, said filtration chamber adaptable to contain a mass of filtering material, said outlet chamber being provided with opening means for ingress of air into said outlet chamber and egress of decontaminated water out of said outlet chamber into the aquarium tank, said inlet chamber being provided with inlet means comprising an inlet through which contaminated water from the tank may flow, an air stream supply means disposed in said outlet chamber which directs ingressed air from said opening means into said outlet chamber thereby when the filtering material is unclogged causing contaminated water from the aquarium tank to flow through said inlet into said inlet chamber and therefrom into said filtration chamber where the contaminated water is substantially decontaminated by the filtering material before flowing into said outlet chamber and being egressed through said opening means into the aquarium tank, and indicating means disposed in said inlet chamber and responsive to flow of water from said inlet to said filtration chamber for signalling flow of the contaminated water through the filtering material, whereby there is no flow of water from said inlet to said filtration chamber when the filtering material is clogged.

2. A filtering device as claimed in claim 1, wherein said indicating means includes visual means for visually indicating water flow from said inlet to said filtration chamber.

3. A filtering device as claimed in claim 2, wherein said visual means includes a body displaceable in said inlet chamber and having a specific gravity of greater magnitude than that of water.

4. A filtering device as claimed in claim 3, wherein the specific gravity of said body is of such a magnitude that said body will rest freely on lower confines of said inlet chamber in absence of water flow from said inlet to said filtration chamber and yet will ascend in presence of water flow from said inlet to said filtration chamber.

5. A filtering device as claimed in claim 4, wherein said housing is transparent at least at the lower confines of said inlet chamber for permitting observation of said body when said body indicates absence of water flow from said inlet to said filtration chamber, thereby signalling the filtering material is clogged.

6. A filtering device as claimed in claim 5, wherein said housing is generally opaque at upper confines of said inlet chamber for concealing said body and indicating the presence of water flow from said inlet to said filtration chamber, thereby signalling flow of the contaminated water through the filtering material.

7. A filtering device as claimed in claim 6, wherein said housing includes an elongate annular member and a platform extending transversely therefrom for dividing said housing into said outlet and filtration chambers, said annular member having a pair of opposite open ends, said platform extending from one of said open ends, said housing including a bottom portion and means for spacing said platform from said bottom portion in parallel relation therewith, said spacing communicating with said annular member, said platform having a plurality of openings for communicating said outlet chamber with said filtration chamber, said platform supporting the filtering material externally of said annular member and internally of said filtration chamber, said air stream supply means being disposed in said annular member.

8. A filtering device as claimed in claim 7, wherein said housing further includes a partition for dividing said housing into said inlet and filtration chambers, and a cover portion spaced from said partition for permitting water to flow from said inlet chamber into said filtration chamber.

9. A filtering device as claimed in claim 8, wherein the spacing between said cover portion and said partition is less than the extent of said body for confining said body in said inlet chamber, said body being spherical.

10. A filtering device as claimed in claim 9, wherein said air stream supply means includes a conduit terminating in an air permeable member and extending in said elongate annular member for dispensing air into said annular member.

11. A filtering device as claimed in claim 10, wherein said inlet includes a plurality of openings extending in mutually perpendicular relation, said housing including a support base for spacing said inlet openings from portions of the aquarium tank that would otherwise prevent water from flowing into said inlet chamber.

* * * * *